United States Patent [19]
Belke et al.

[11] 4,047,984
[45] Sept. 13, 1977

[54] CORPUSCULAR ENERGY BEAM PRODUCED MICROASPERITIES

[75] Inventors: William H. Belke; Joseph C. Hafele; Ernest W. Landen; Thomas J. Richards, all of Peoria, Ill.

[73] Assignee: Caterpillar Tractor Co., Peoria, Ill.

[21] Appl. No.: 632,602

[22] Filed: Nov. 17, 1975

[51] Int. Cl.$^2$ .......................... C21D 1/06; C22C 35/00
[52] U.S. Cl. ...................................... 148/152; 148/39; 29/90 R
[58] Field of Search .................. 148/9.5, 39, 145, 148, 148/152, 36; 331/94.5; 204/129.1; 29/90 R, 90 A, 90 B, 90.2; 72/54, 703

[56] References Cited

U.S. PATENT DOCUMENTS

| | | | |
|---|---|---|---|
| 3,633,010 | 1/1972 | Svetlichny | 148/9.5 |
| 3,650,846 | 3/1972 | Holland et al. | 148/39 |
| 3,656,988 | 4/1972 | Steffan et al. | 148/9.5 |
| 3,756,870 | 9/1973 | Kasper et al. | 148/39 |
| 3,945,893 | 3/1976 | Ishimori et al. | 204/129.1 |

OTHER PUBLICATIONS

Hamilton et al., Theory of Lubrication by Micro-Irregularities, in Trans. Asme; Mar. 1966, pp. 177-189.
Otto D., Triangular Asperites Control... Lubrication; in SAE JOURN; Detroit, Feb. 1974, pp. unmarked.
Batelle Research Outlook: Technology of Rubbing Surfaces, vol. 1, Feb. 1969, pp. 26-28.
Anno et al., Microasperity Lubrication, in Journ. Lub. Tech., (Trans, Asme) Apr. 1968, pp. 351-355.

*Primary Examiner*—Walter R. Satterfield
*Attorney, Agent, or Firm*—Phillips, Moore, Weissenberger, Lempio & Majestic

[57] ABSTRACT

A method and apparatus for producing microasperities for enhancing lubrication is provided. A pulsed laser beam or other heat source having high resolution with respect to time and space is focused onto a surface such as a thrust bearing surface to produce an array of microasperities of controlled size, shape and density. The staggered ramp shaped asperities produce an enhanced lubrication effect.

8 Claims, 11 Drawing Figures

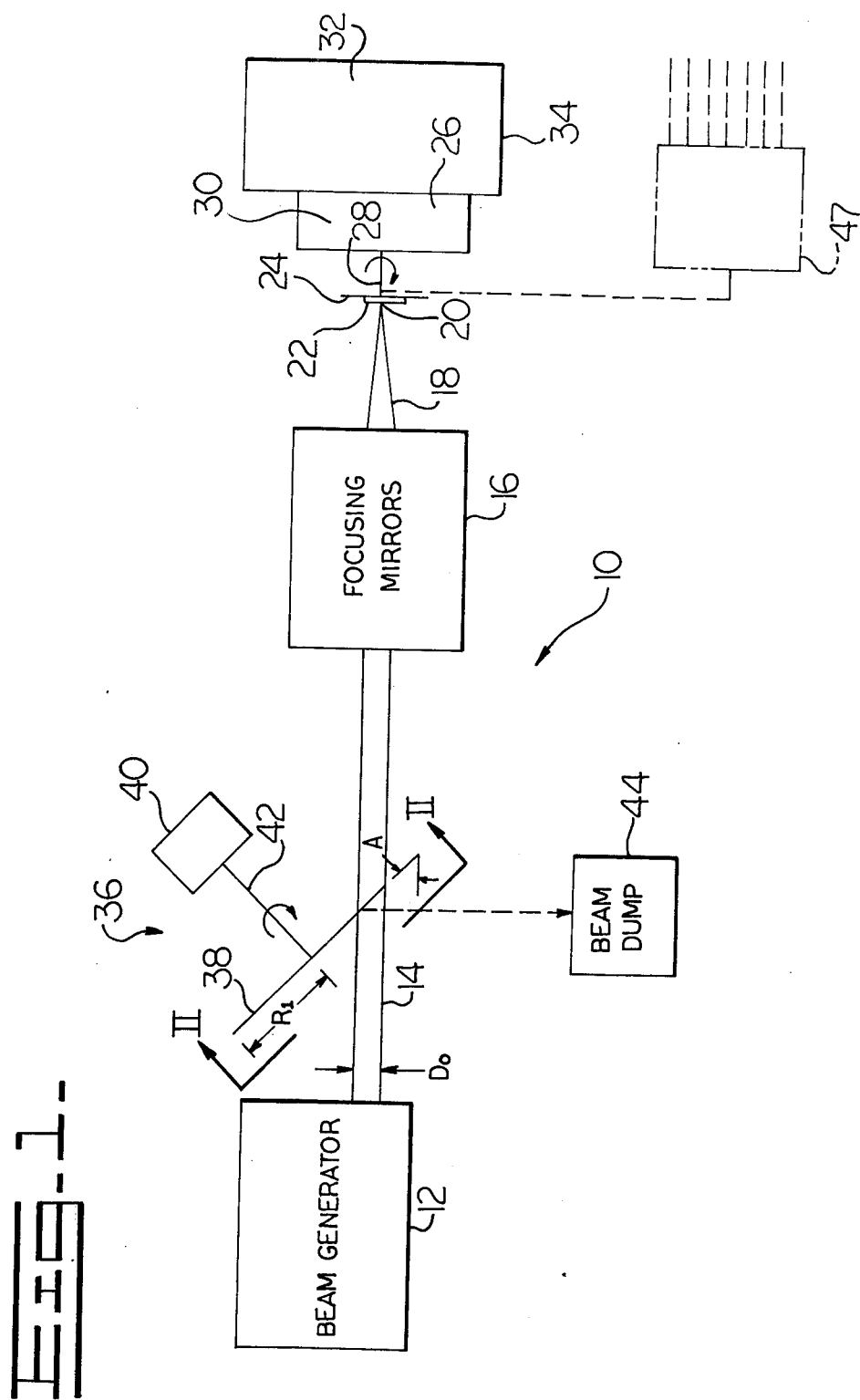

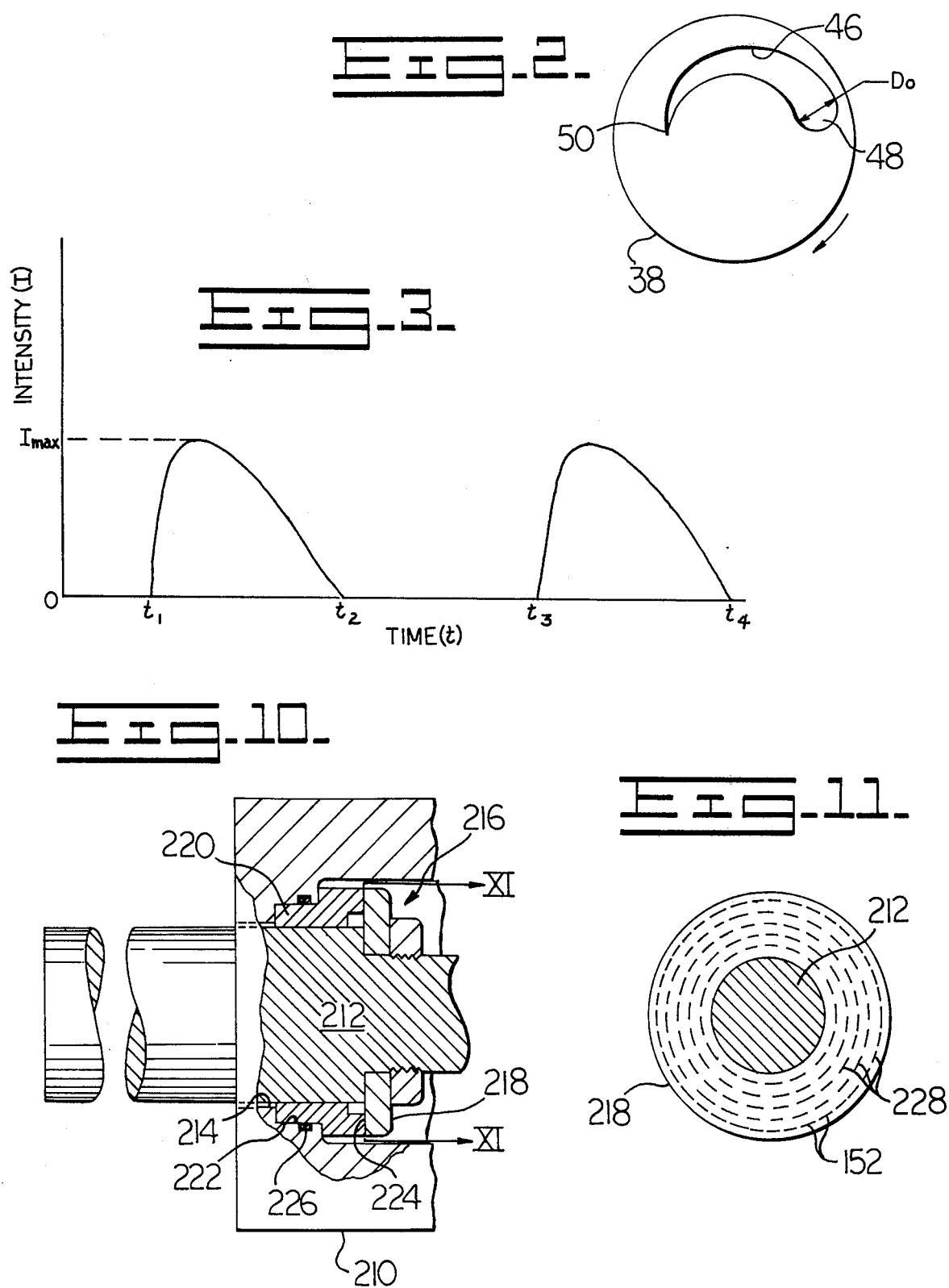

CORPUSCULAR ENERGY BEAM PRODUCED MICROASPERITIES

BACKGROUND OF THE INVENTION

This invention relates to corpuscular energy beam produced microasperities for lubrication. More particularly, this invention relates to an apparatus such as a laser apparatus or other producing a beam of corpuscular energy for producing controlled microasperities on surfaces such as bearing surfaces.

In rotating machinery, and especially where rotating shafts operate partly within a housing that contains fluid under pressure, dynamic seals are used. These dynamic seals consist of two basic parts, a rotor and a stator. The stator is fixed to the housing, whereas the rotor bears against the stator and is fixed to a shaft passing through the housing. In high pressure and temperature applications, and especially where leakage must be kept to a minimum the metal rotor rotates against a wear resistant stator of carbon material. Of course, with the rotor heavily loaded against the stator to ensure good sealing, wear is enhanced. This results in frequent replacement of the seals, resulting in unwanted down time and cost.

Somewhat by accident it was found that thin films were forming between the rotating surfaces of face seals in certain applications. These films apparently existed in spite of the high loading forces placed on the seals. It was also found that the presence of these thin films of lubricant on the seal during operation resulted in considerably longer seal life. This led to research into thin film lubrication mechanisms and the use of microasperities to produce such films of a controlled thickness.

Microasperities are small projections or protuberances intentionally formed on one or both of the bearing surfaces of a seal. These small protrusions or bumps have been found to produce the desired thin film of lubricant and retain it during dynamic operation of the seal. With this lubrication system, cavitation of the lubricant film occurs at the trailing edge of the microasperities and flow of lubricant around and over the microasperities produces a pressure distribution that supports the load by controlled oil film thickness, producing a separation of rotor and stator. The separation produced by the controlled oil film in the field of microasperities is much greater than with a smooth lapped surface. This has the effect of reducing the localized and surface gouging by small carbides, and therefore greatly reduced wear. The variables involved are the size and shape or microasperities, the viscosity of the lubricant liquid, the rotor velocity and the thickness of the liquid film over the microasperities.

Microasperities have been formed in numerous ways, and predominantly by chemical milling of photoetched, previously finished surfaces. Additional techniques include lapping, coining, and other etching techniques.

These techniques have been somewhat refined to the point where there has been a progression from randomly sized and shaped asperities to attempts to produce homogeneous asperity surfaces. The homogeneous surfaces are of course more amenable to analytical prediction. Cylindrical asperities in a geometric array have been produced by using photoetching techniques. These asperities have a circular contact surface. More recently, triangular shapes have been considered. See, for example: Dennis Lee Otto, *Triangular Asperities Control Seal Leakage and Lubrication,* Society of Automotive Engineers, Paper No. 740201, 1974.

However, these triangular asperities, as with the aforementioned circular asperities, have flat plane contact surfaces which are the necessary result of using chemical etching techniques wherein the unetched surface is merely masked by use of a coating. Other more complex shapes, such as pyramidal or ramp shaped, have been proposed, which would require new manufacturing techniques.

The present invention utilizes a means for producing a beam of corpuscular energy and a control means therefor, such as a beam chopper, for producing microasperities of a controlled size, shape and density on bearing surfaces. The beam of corpuscular energy is conveniently a laser beam, an electron beam, or a spark discharge. As an alternative to a mechanical beam chopper, the duration of the beam may be controlled by electronically pulsing the beam. The shape of the microasperity produced is pyramidal, or ramp shaped. An abrupt frontal wall and a tapering rear wall of such shaped asperity produces a desired cavitation effect and consequently enhanced seal dynamics.

OBJECTS OF THE INVENTION

It is therefore the primary object of this invention to produce microasperities of a more uniform size, shape, and density.

It is a further object of this invention to produce asperities in a controlled array of a ramp, or pyramidal, shape.

It is a still further object of this invention to produce microasperities by using a controlled beam of corpuscular energy, such as a laser beam.

It is yet another object of this invention to produce microasperities on bearing surfaces by using a controlled beam of corpuscular energy and a control means therefor.

Other objects of this invention will become more readily apparent from a review of the following description, having reference to the accompanying drawings.

BRIEF DESCRIPTION OF THE DRAWINGS

FIG. 1 is a laser system of the instant invention for producing microasperities on bearing surfaces;

FIG. 2 is a view taken along lines II—II in FIG. 1, and showing the details of the mechanical laser beam chopper;

FIG. 3 is a graph illustrating the effect of the beam chopper on laser intensity against time;

FIG. 10 is a side elevation view in partial section of a portion of a shaft housing showing a rotor-stator seal arrangement; and, FIG. 11 is a view taken along lines XI—XI in FIG. 10 showing the asperity array.

DETAILED DESCRIPTION

Figure 4:
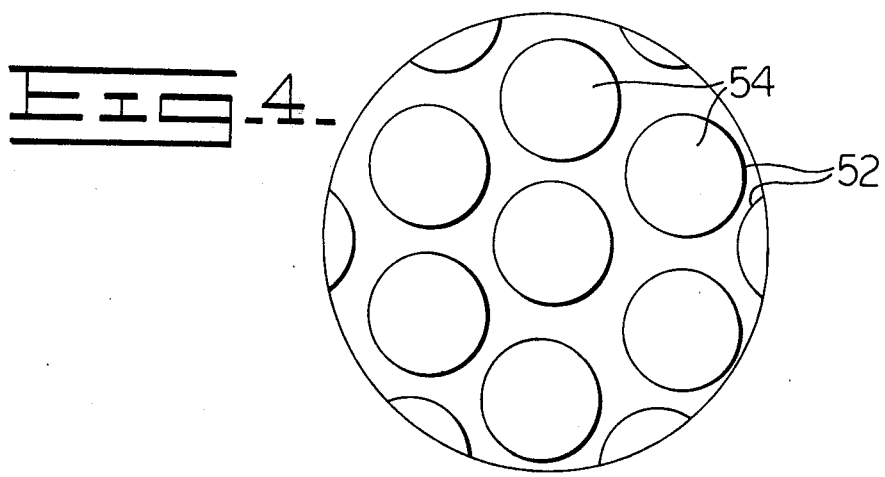
FIG. 4 is an enlarged view of a portion of a bearing surface showing an array of conventional circular microasperities thereon.

Turning to FIG. 1, there is shown a corpuscular energy beam system for producing microasperities according to the instant method and system. The corpuscular energy beam system shown generally at 10 comprises a beam generator 12 such as an HPL-10 laser produced by the Avco Everett Corporation and rated at 10 KW. It should be understood that the present invention is broadly directed to use of a corpuscular energy beam, including but not limited to a laser beam, electron beam, or a spark discharge. While the following discussion talks in terms of a laser, such is merely for the sake of convenience. The laser produces a continuous columnated beam or pulse of cylindrical nature having a diameter $D_o$. Focusing mirrors 16 intercept the beam 14 and converge it into the beam 18 having a minimum spot size of 0.013cm diameter with the beam divergence of plus or minus 64.2 mrad. at a point 20 on a workpiece 22. Workpiece 22 may be a flat bearing surface such as a rotor or stator. A work table 24 is rotatably mounted on a vertically movable carriage 26 by means of a shaft 28. A motor (not shown) at 30 in carriage 36 is used to drive shaft 28 and thereby work table 24 to rotate the workpiece 20. The motor is shown generally at 32 and workpiece support housing 34 serves to translate work table 24.

In order to obtain desirably shaped and sized microasperities, a means for shaping such asperities in the form of a beam chopper system shown generally at 36 is provided. Beam chopper system 36 comprises a round polished copper disk 38 of radius $R_1$ mounted at an angle A equal to approximately 45°. A motor 40 rotates the copper disk 38 through a shaft 42 connected to the center thereof. The copper beam chopper serves to normally direct beam 14 into a beam dump 44. As best seen in FIG. 2, the disk 38 contains therein a crescent shaped hole 46. The crescent shaped hole 46 is sized such that the entire beam width $D_o$ of FIG. 1 passes therethrough at its widest portion 48. Hole 46 narrows to a rearward point 50 where the beam is entirely chopped.

The beam intensity at point 20 on the workpiece 22 as a function of time is shown in FIG. 3. The geometry of the hole 46 shown in FIG. 2 produces a variable intensity laser pulse as shown by the curves in FIG. 3. The beam intensity raises from zero to a maximum value ($I_{max}$) and then abruptly decays to zero again during the time from $t_1$ to $t_2$. After a period of zero intensity, the beam again repeats a pulse cycle from $t_3$ to $t_4$. This produces a variation in the depth of hardening of the surface on which the laser beam impinges, thereby producing a series of ramp or pyramidally-shaped asperities, as will be hereinafter described.

As an alternative to using a mechanical chopper system 36 and beam dump 44 as above described, the corpuscular energy beam may be shaped electrically. For example, a low powered laser with shaped pules produced electrically would eliminate the need for a mechanical chopper. As a further alternative, a multiple image lens system 47 could be added which would separate the single beam into a plurality of spaced beams so that a plurality of asperities would be simultaneously produced. This would considerably shorten the time required to cover a surface with asperities.

FIG. 4 shows a conventional asperity or array pattern produced by chemical etching. The pattern is comprised of a plurality of homogeneously-spaced cylindrical asperities 52 having flat, circular contact portions 54. A profile of a single asperity 56 is shown at FIG. 5, when the top surface portion 54 is spaced a distance $h$ from an adjacent bearing surface 58 by means of an oil or lubricant film 60.

Figure 5:
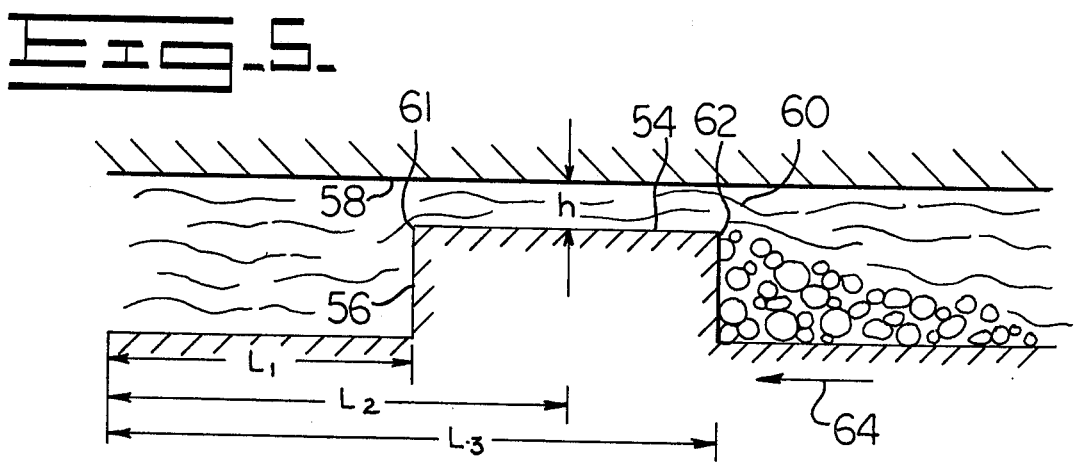
FIG. 5 is an enlarged side elevation view of a single cylindrical microasperity having a circular contact surface.
Figure 6:
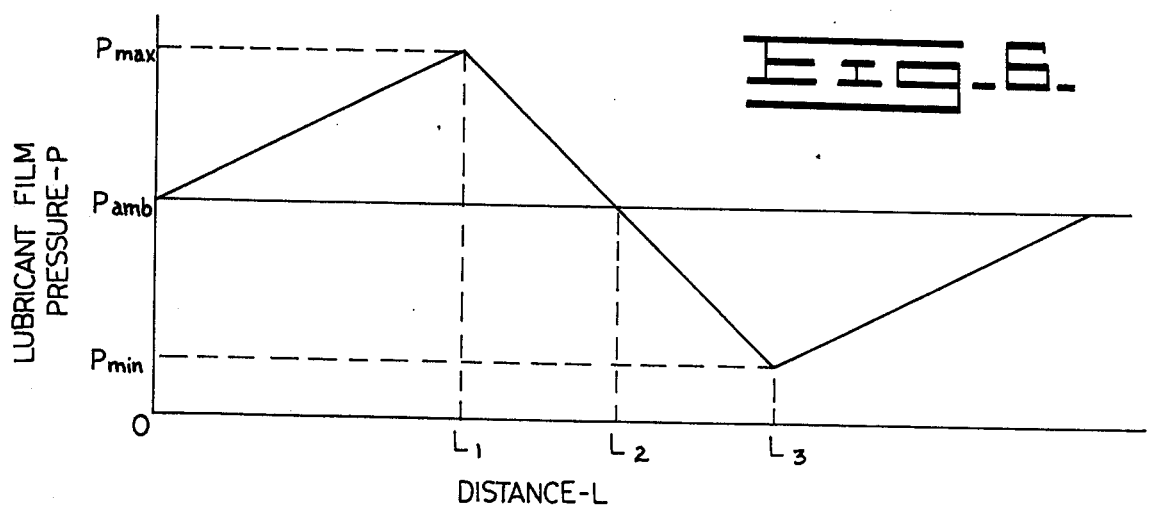
FIG. 6 is a graph illustrating the pressure distribution across the asperity shown in FIG. 5.

FIG. 6 is a graph of the lubricant or fluid pressure corresponding with points in front of, on, and behind or downstream of the asperity of FIG. 5, using a base of ambient pressure. As shown in FIG. 5, the pressure distribution extends beyond the front and back edges 61,62, respectively, of the asperity. The pressure profile ranges between maximum ($P_{max}$) at the leading edge at a distance $L_1$ to a minimum ($P_{min}$) at the back edge at a distance $L_3$. Ambient pressure ($P_{amb}$) is present at the center at a distance $L_2$. The arrow 64 shows the direction of movement of the asperity with respect to the stationary bearing surface 58.

Figure 7:
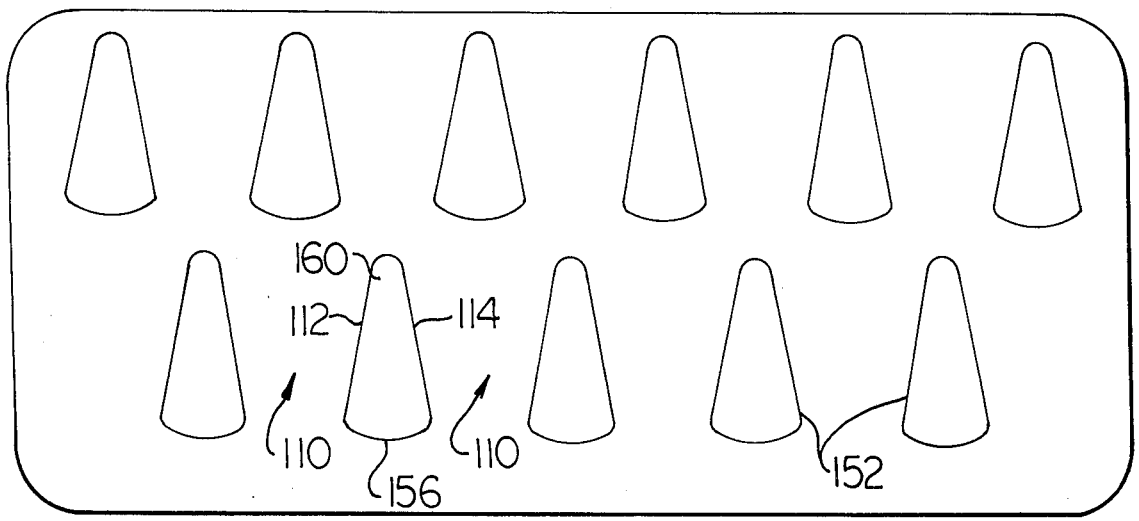
FIG. 7 is a top plan view of a portion of a bearing showing an array of the asperities of the instant invention.
Figure 8:
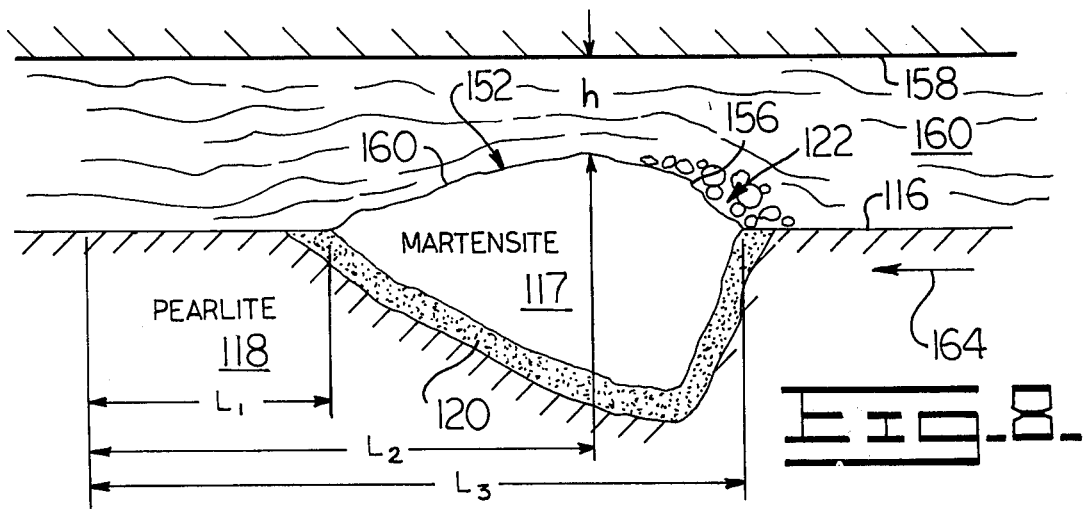
FIG. 8 is a side elevation view in cross section showing a single pyramidal or ramp shaped asperity of the instant invention and illustrating the bearing structure thereof.

Turning to FIG. 7, there is shown a top view of an array of ramp or pyramidally-shaped asperities 152 in a homogeneously spaced array. The asperities are generally triangularly shaped and are in staggered rows and columns with interstices 110 therebetween. The asperities each include a gradually tapered front portion 160 and a steep back portion 156. Tapered side portions 112,114 which gradually taper from front leading edge 160 define a generally pyramidally-shaped or ramp shaped asperity. As best seen in FIG. 8, the asperities produced on the bearing surface 116 are caused at the point of impingement of the laser beam. The bearing surface may be metal such as unhardened carbon steel which expands upon hardening. By laser heating and allowing the material to self-quench, an asperity such as that shown is produced. A hardened teardrop of martensite 117 is produced at the center in the surrounding bearing, which is pearlite 118. The transition region 120 is formed between the martensite and pearlite regions. A hardened spot of 0.01 inches would produce an asperity of 0.001 to 0.000001 inches depending on the type of steel used.

Figure 9:
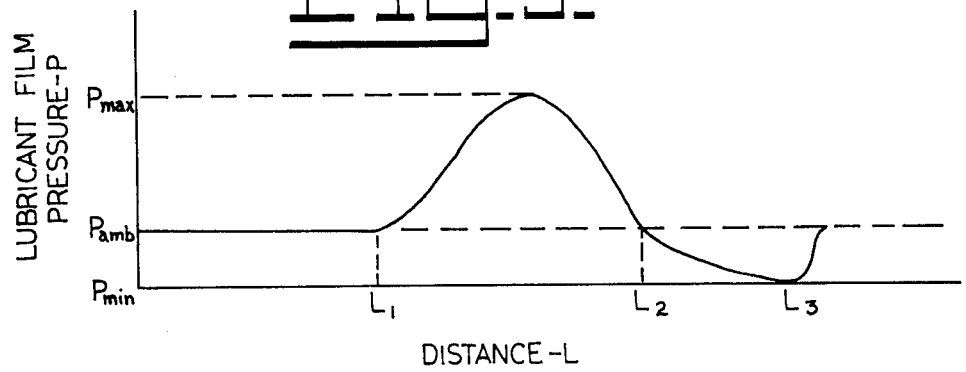
FIG. 9 is a graph illustrating the pressure distribution across the pyramidal asperity of FIG. 8.

In operation, the bearing surface 116 moves in the direction 164 with respect to stationary surface 158. As best seen in FIG. 9, as the members slide relative to one another a high pressure builds up over the face of the microasperity because the confined liquid is highly incompressible and produces a pressure profile shown, Cavitation occurs behind or on the downstream side of the microasperity as shown at 122, when $P_{min}$ equals the vapor pressure of the lubricant. The net effect is an overpressure; that is, a pressure above the ambient pressure that lifts and supports the moving member with respect to the stationary member.

Turning to FIG. 10, there is shown an application of the microasperities of the instant invention. In the application a portion of a shaft housing 210 is partially cut away to show a stepped shaft 212 extending through a shaft bore 214 in the housing. Rotary seal 216 is comprised of a flat ring-shaped rotor 218 which bears against a cup-shaped stator 220 fitted within an accommodating groove 222 in the housing. The rotor and stator seal along a circular line of contact 224. O-ring seal 226 is located in an accommodating groove in the housing or sealing stator.

As seen in FIG. 11, the rotor ring contains a plurality of microasperities in an array of concentric circles 228. As seen in FIG. 1, these concentric circles are produced by the method of rotating the ring by means of motor 30 in a vertically movable workpiece support 26. By indexing workpiece support 26 slightly, different concentric rings of asperities can be produced. The method involves impinging the focused laser beam on the bearing surface of a preselected varying intensity while moving the body as described. If, on the other hand, a rectangularly or other shaped piece is to be covered, the rotation could be stopped and workpiece support 26 indexed horizontally as well as vertically.

It is to be understood that the foregoing description is merely illustrative of a preferred embodiment of the invention, and that the scope of the invention is not to be limited thereto but is to be determined by the scope of the appended claims.

What is claimed is:

1. A method of producing asperities on a body defining a surface, comprising the steps of selecting a body of unhardened pearlite carbon steel material having the property of expanding by grain structure change under the action of a beam of corpuscular energy, impinging a beam of corpuscular energy on said surface, varying the intensity of said beam from a minimum to a maximum value and then abruptly dropping the intensity back to said minimum so as to produce asperities, moving said body in a predetermined path relative to said beam while varying the intensity of said beam, and, repeating the above steps so as to produce a plurality of spaced, raised, martensitic asperities defining a height, length and width on said surface.

2. The method of claim 1 wherein the step of moving comprises, rotating said body so as to produce a first circular pattern of asperities on said surface.

3. The method of claim 2 further including the step of indexing said body with respect to said beam after said circular pattern of asperities is produced and further rotating said body so as to produce a further circular pattern of asperities on said surface having a diameter different from that produced with said first circular pattern.

4. The method of claim 3 including the steps of further indexing and further rotating said body so as to produce a concentric series of spaced, circular asperity patterns on said surface.

5. The method of claim 1 wherein the step of moving comprises, linearly translating said body with respect to said beam so as to produce a first linear pattern of asperities on said surface.

6. The method of claim 5 further including the step of indexing said body with respect to said beam after a first linear pattern of asperities of a desired length has been produced, and further linearly translating said body in a direction generally parallel to the direction of said first linear pattern of asperities so as to produce a further linear pattern of asperities on said surface spaced from said first linear pattern.

7. The method of claim 6 including the steps of further indexing and further linearly translating said body so as to produce an asperity array of rows and columns on said surface.

8. The method of claim 1 further including the preliminary step of splitting said beam into a plurality of spaced beams prior to said step of impinging whereby a plurality of spaced asperity patterns are simultaneously produced on said surface.

* * * * *